(12) United States Patent
Andre et al.

(10) Patent No.: US 7,905,533 B2
(45) Date of Patent: Mar. 15, 2011

(54) REAR MODULE FOR FITTING ON A MOTOR VEHICLE

(75) Inventors: Gérald Andre, Amberieu en Bugey (FR); Guilherme Amorin, Chazey sur Ain (FR); Jérôme Fillon, Sainte Julie (FR); Fabien Delwal, Chalamont (FR); Denis Barral, Montalieu Vercieu (FR)

(73) Assignee: Compagnie Plastic Omnium, Lyons (FR)

( * ) Notice: Subject to any disclaimer, the term of this patent is extended or adjusted under 35 U.S.C. 154(b) by 678 days.

(21) Appl. No.: 11/976,540

(22) Filed: Oct. 25, 2007

(65) Prior Publication Data
US 2008/0127570 A1 Jun. 5, 2008

(30) Foreign Application Priority Data
Oct. 27, 2006 (FR) ...................................... 06 54617

(51) Int. Cl.
*B62D 27/00* (2006.01)

(52) U.S. Cl. ...... 296/56; 296/30; 296/146.5; 296/146.6; 296/146.8; 296/203.04; 296/193.08; 49/207; 49/142

(58) Field of Classification Search ................ 49/61–63, 49/67, 68, 104, 142, 207, 125; 296/29, 30, 296/205, 56, 146.5, 146.6, 146.8, 203.04, 296/193.08
See application file for complete search history.

(56) References Cited

U.S. PATENT DOCUMENTS

| | | | | |
|---|---|---|---|---|
| 1,263,248 A | * | 4/1918 | Hope | 49/62 |
| 1,934,546 A | * | 11/1933 | Lewerentz | 49/62 |
| 1,984,977 A | * | 12/1934 | Mize | 312/276 |
| 4,121,380 A | * | 10/1978 | Lockshin | 49/67 |
| 4,258,950 A | | 3/1981 | Itoh et al. | |
| 4,389,817 A | * | 6/1983 | Olberding | 49/163 |
| 4,653,797 A | * | 3/1987 | Tran | 296/152 |
| 4,880,267 A | | 11/1989 | Ohya | |
| 4,972,639 A | * | 11/1990 | Woznick | 52/202 |
| 5,449,213 A | * | 9/1995 | Kiley et al. | 296/56 |
| 5,692,792 A | * | 12/1997 | Klar | 296/26.02 |

(Continued)

FOREIGN PATENT DOCUMENTS

DE 29 32 047 A1 2/1980

(Continued)

*Primary Examiner* — Jerry Redman
(74) *Attorney, Agent, or Firm* — Oliff & Berridge, PLC

(57) ABSTRACT

The invention relates to a rear module for fitting to a motor vehicle, the module comprising a large door for being pivotally mounted about an axis, the large door extending in a direction parallel to said axis between two stiffener uprights both presenting a cross-section of thickness, taken perpendicularly to the door, that is not less than a first thickness, the large door having an opening extending as far as said uprights in the direction parallel to said axis; and a small door mounted on the large door to move between an open position uncovering said opening, and a closed position closing said opening, the small door extending in the direction parallel to the axis between two stiffener uprights both having a cross-section of thickness, taken perpendicularly to the door, that is not less than a second thickness, the uprights of the small door covering the uprights of the large door when the small door is in the closed position. The uprights of the small door and the uprights of the large door are shaped in such a manner as to engage in pairs one in another when said small door is in the closed position so as to present a maximum thickness taken perpendicularly to the door, that is less than the sum of the first and second thicknesses.

9 Claims, 2 Drawing Sheets

U.S. PATENT DOCUMENTS

| | | | |
|---|---|---|---|
| 5,876,086 A * | 3/1999 | Lagrou et al. | 296/146.11 |
| 6,196,617 B1 * | 3/2001 | Beck | 296/146.11 |
| 6,526,694 B1 * | 3/2003 | Cosgrove | 49/67 |
| 6,938,665 B2 * | 9/2005 | Lewis et al. | 160/96 |
| 7,401,832 B2 * | 7/2008 | Yui et al. | 296/57.1 |
| 2003/0015884 A1 * | 1/2003 | Paiva et al. | 296/56 |
| 2003/0214148 A1 | 11/2003 | Neidlein | |
| 2004/0036318 A1 * | 2/2004 | Maeda | 296/146.8 |
| 2009/0140544 A1 * | 6/2009 | Pollak | 296/186.3 |
| 2009/0243333 A1 * | 10/2009 | Konet et al. | 296/146.8 |

FOREIGN PATENT DOCUMENTS

| | | |
|---|---|---|
| FR | 2 764 551 | 12/1998 |
| JP | 60215476 A * | 10/1985 |
| JP | 01032921 A * | 2/1989 |
| JP | 02117417 A * | 5/1990 |

* cited by examiner

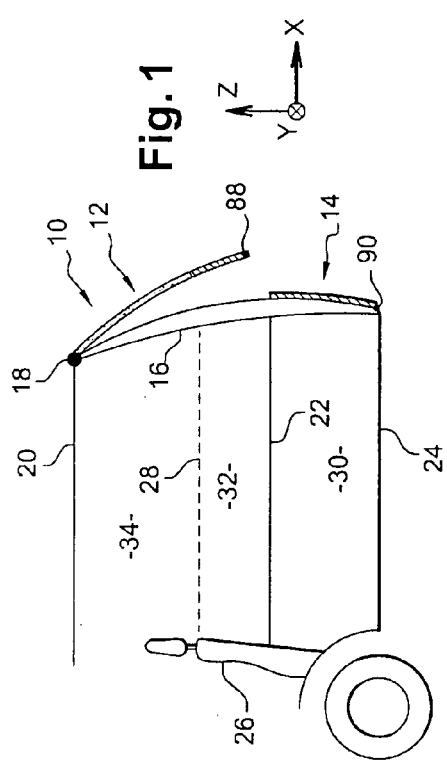
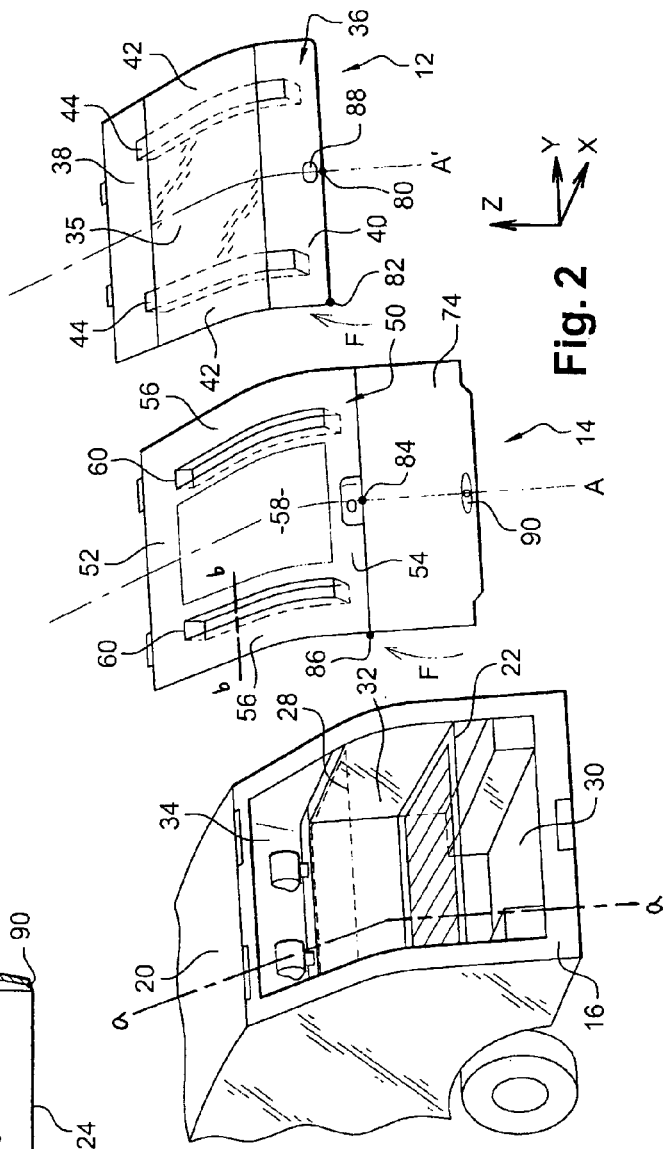

REAR MODULE FOR FITTING ON A MOTOR VEHICLE

The present invention relates to a rear module for fitting on a motor vehicle.

BACKGROUND OF THE INVENTION

In the state of the art, in particular in US 2003/0214148, a rear module is already known that comprises a small door carrying a rear window that is defined by a small frame, the frame including in particular two lateral uprights, the outline of each upright being inscribed in an envelope presenting a first thickness. The module also has a large door, on which the small door is fitted, and defined by a large frame including in particular two uprights, the outline of each upright being inscribed in an envelope presenting a second thickness. The uprights of each of the doors in that module are superposed one on another so that together the superposed uprights are inscribed in an envelope of thickness that is equal to the sum of the first and second thicknesses.

The large door constitutes a tailgate mounted to pivot about a horizontal axis situated close to the roof of the vehicle, and the small door is a rear window likewise mounted to pivot about a horizontal axis situated close to the roof of the vehicle. That rear window gives access to the top portion of the trunk, which portion can be referred to as a vision compartment, that is situated above a rear shelf, said compartment generally being left empty in the vehicle so as to enable the driver to use a rearview mirror. The tailgate covers the entire trunk, or more precisely an opening constituted by the rear ring of the vehicle body.

The idea of fitting a small door on a large door is particularly advantageous for the user, but it nevertheless presents a problem of compactness. Superposing two doors inevitably increases the thickness of the rear module in the longitudinal direction of the vehicle. In addition, the presence of the small door can lead to extra thickness on the large door, thereby spoiling the external appearance of the vehicle.

It is known that each of the doors presents an area that is relatively large, with each door generally being secured to the body of the vehicle solely by means of two hinges, thus making it necessary for each of them to present a certain amount of stiffness, in particular in order to avoid deformation in twisting when they are being handled while open, in particular while they are being closed by exerting a force on one side rather than in the middle.

OBJECT AND SUMMARY OF THE INVENTION

A particular object of the present invention is to provide a rear module having two doors, while being sufficiently rigid and particularly compact in the longitudinal direction of the vehicle.

To this end, the invention provides a rear module for fitting to a motor vehicle, the module comprising:
 a large door for being pivotally mounted about an axis, the large door being delimited in a direction parallel to said axis by two stiffener uprights both presenting a cross-section of maximum thickness, taken perpendicularly to the door, that is equal to a first thickness, the large door having an opening extending as far as said uprights in the direction parallel to said axis; and
 a small door mounted on the large door to move between an open position uncovering said opening, and a closed position closing said opening, the small door being delimited in the direction parallel to the axis by two stiffener uprights both having a cross-section of maximum thickness, taken perpendicularly to the door, that is equal to a second thickness, the uprights of the small door covering the uprights of the large door when the small door is in the closed position;
 wherein the uprights of the small door and the uprights of the large door are shaped in such a manner as to engage in pairs one in another when said small door is in the closed position so as to present a maximum thickness taken perpendicularly to the door, that is less than the sum of the first and second thicknesses.

In the present description, the term "stiffener upright" designates an upright that provides stiffness to the door. For this purpose, the upright presents a certain amount of thickness giving it a significant inertia, and consequently a certain amount of resistance to buckling in a direction perpendicular to the axis of the door.

In the invention, the uprights of each of the doors are not only superposed, but they are engaged or nested one in another. By means of this mutual engagement, the uprights present a thickness in the longitudinal direction of the vehicle that is less than the thickness they would present if they were superposed one on the other, which corresponds to adding the thicknesses of each of the doors, with this engagement reducing the overall size of the rear module in the longitudinal direction of the vehicle. Advantageously, the total thickness of the uprights when superposed is practically identical to the thickness of a single one of the uprights, thereby reducing overall size considerably.

Furthermore, it should be observed that since the uprights are superposed in the longitudinal direction, the presence of two rear doors on the vehicle has no impact on the visibility made available to the driver through the rear window, unlike a module where the uprights are juxtaposed in the transverse direction of the vehicle.

Consequently, the invention provides a rear module having two doors, but presenting substantially the same thickness as a rear module having only one door.

The rear module of the invention may also have one or more of the following characteristics.
 The uprights of the small door and of the large door are each of U-shaped channel section with the open face thereof facing towards the inside or the outside of the vehicle, the channel sections being suitable for mutual engagement in pairs.
 The small door includes a rear window and at least one outside edge of each upright of the small door is secured to the rear window so as to combine its stiffness with that of the window. For a channel-section upright having its open face directed towards the window, the upright defines a hollow body that is closed by the window and that provides particularly good stiffness. In this variant, either both outside edges of the uprights are secured to the window, thereby providing a genuine hollow body and conferring best stiffness to the assembly, or else only one of its two outside edges is secured to the window, thereby defining a hollow body that is almost closed, but presenting the advantage that it is easier to fasten to the rear window. The fastening of one or both outside edges is preferably performed by adhesive bonding to the rear window.
 The module includes a first weather strip arranged between each lateral upright of the small door and the lateral upright of the large door with which it engages, this first weather strip being designed to be in register with a second weather strip arranged on the body of the vehicle. This configuration is particularly advantageous because the two weather strips are disposed in a common plane in the longitudinal direction of the vehicle. As a result, when the doors are slammed shut, the forces exerted by these two weather strips on the uprights of the large door lie, in section, on a common axis and facing in opposite directions, such that they compensate and above all do not generate twisting torque on said uprights. The uprights of the large door are thus protected from any risk of deforming in twisting.

The small door is stronger in twisting than the large door. Thus, whereas in the state of the art the large door is particularly rigid and constitutes a kind of carrier for the small door, the inventors of the present invention have had the idea of making a small door that, paradoxically, becomes a carrier for the large door. Since the large door can be mounted in such a manner as to be open only when it is locked to the small door, the large door can benefit from the stiffness of the small door and will appear to be stiff while it is being maneuvered, without it being necessary for it to have a large amount of its own stiffness. In other words, behavior is as though the small door conferring stiffness to the larger door constitutes a rigid insert integrated in the large door.

It should be observed that one way of determining the twisting strength of a door that pivots about a pivot axis is to subject it, while in the open position, to a rotary torque about an axis that is perpendicular to and that intersects its pivot axis. More specifically, the measurement can be carried out on the door while in a horizontal position by applying a downward force on one corner of the door and while applying the same force upwards on the other corner of the door.

Thus, to compare the twisting strength of the small door with that of the large door, the operation is repeated in succession on the small door alone, with the large door closed, then on the large door alone, with the small door open, so as to prevent it from performing the above-explained function of a rigid insert insulated in the large door, but by applying the forces not on the corners of the large door but on its side uprights, at the positions occupied by the corners of the small door when it is closed.

The deformation that is obtained for a given force is noted in each configuration, or conversely the force required to achieve a given amount of deformation is noted, and it is deduced therefrom which of the two doors is the stiffer.

Said small door comprises a first bodywork panel that is opaque extending over its entire width, and the large door has a second bodywork panel extending the first panel. Such a configuration of the small and large doors is particularly useful when the vehicle includes an intermediate floor arranged between the bottom floor and the rear shelf of the vehicle, since the small door closes not only the vision compartment of the vehicle, but also an intermediate compartment situated between the rear shelf and the intermediate floor.

The uprights of the large door include, on their inside faces, centering means for centering the large door relative to the rear ring of the vehicle body. Such means enable the large door to be positioned at the time it is mounted on the vehicle body. In addition, these centering means provide an additional portion in relief that increases the inertia of the uprights.

The uprights of the doors are made of a plastics material that may be thermoplastic or thermosetting. Because the uprights engage mutually, stiffness is satisfactory and it is not essential to use uprights made of metal.

The invention also provides a set of two rear modules suitable for being fitted on a same motor vehicle, one of the modules being a two-door module as defined above, the other module having a single door, which single door is delimited, in the direction parallel to the axis, by two stiffener uprights both presenting a total cross-section constituted by a main portion and an additional portion, the main portion being identical to the cross-section of the uprights of the large door of the two-door module, and the additional portion being shaped in such a manner as to increase the thickness of the total cross-section taken perpendicularly to the door in such a manner that said thickness is equal to the maximum thickness of two mutually-engaged uprights of the two-door module.

By using such a set, it is possible to manufacture a large door that can be usable both on a vehicle having a single door and a vehicle having two doors, i.e. the above-described large and small doors. Such a set enables a common mold to be used for manufacturing the uprights both of the large door and of the single-door module, with it being required, in the event of the vehicle having two doors, merely to trim the uprights a little, by removing the additional portion of its cross-section. This makes it possible to manufacture large doors of standard shape without it being necessary to provide different molds depending on whether or not the large door is to receive a small door.

In a particular embodiment, the uprights of the door in a single-door module include stiffener ribs in the main portion of the cross-section. Under such circumstances, the operation of trimming the uprights to convert it into an upright for a large door of a two-door module further consists in eliminating the ribs, or some of them, e.g. by cutting, milling, or machining.

BRIEF DESCRIPTION OF THE DRAWINGS

The invention can be better understood on reading the following description given purely by way of example with reference to the drawings, in which:

FIG. 1 is a diagrammatic section view of a motor vehicle including a rear module of the invention;

FIG. 2 is an exploded diagrammatic perspective view of the FIG. 1 vehicle;

MORE DETAILED DESCRIPTION

Figure 4:
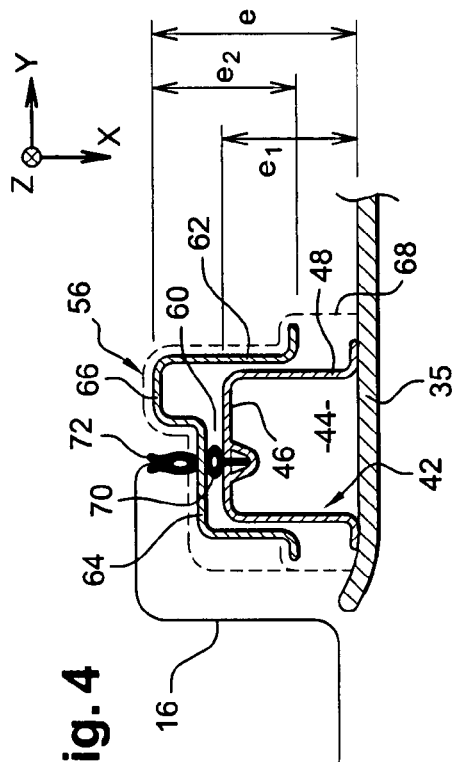
FIG. 4 is a diagrammatic section view of the upper portion of the FIG. 1 module, the two doors being in the closed position, on a section transversal plane b-b of FIG. 2, perpendicular to the door.

As can be seen in FIG. 1, a rear module 10 comprises a small door 12 and a large door 14.

The small door 12 is fitted onto the large door 14 and the assembly is fitted onto the rear ring 16 of the body of a vehicle, each door being mounted to pivot about a common horizontal axis 18 arranged close to the roof 20 of the vehicle, and possibly motor driven.

The small door 12 extends over the vehicle from the vehicle roof 20 down to an intermediate floor 22. This intermediate floor 22 is arranged above the bottom floor 24 of the vehicle trunk, and at a height that is lower than the height of the back of the rear seats 26 of the vehicle. It should be observed that this height corresponds to the top of rear seats or the top of a rear bench seat, ignoring any headrests. More precisely, in this embodiment, the vehicle has a rear shelf 28 situated higher than the rear seat 26, and the intermediate floor 22 is arranged below the rear shelf 28. The intermediate floor 22 subdivides the trunk of the vehicle into two compartments, namely a bottom compartment 30, defined by the bottom floor 24, the intermediate floor 22, and the bottom portion of the large door 14, and a top compartment. The top compartment is itself subdivided into two compartments, namely an intermediate compartment 32 defined by the intermediate door 22, the rear shelf 28, and the bottom portion of the small door 12, and a "vision" compartment 34, defined by the rear shelf 28, the roof 20, and the top portion of the small door 12.

As can be seen in FIG. 1, the small door 12 has a rear window 35 and is defined by a frame called the small frame 36, comprising a top horizontal edge 38, a bottom horizontal edge 40, and two similar uprights 42.

It should be observed that the concept of a frame as used herein is not limiting in any way. In particular, in the invention, uprights can be present on the door without there being any frame proper in existence.

The bottom edge 40 is in the form of a strip of width greater than the width of the other edges of the frame 36, either constituting a bodywork part that is visible from outside the vehicle, or having such a part fitted thereto. The bottom edge closes the intermediate compartment of the vehicle when the small door is closed, and gives access to the intermediate compartment when it is open.

Each of the uprights 42 of the small door 12 includes a chamber 44 extending over the full height of the upright and of channel-section, U-shaped, with the open face directed towards the outside of the vehicle. As can be seen in FIG. 4, this chamber 44 is defined by a web 46 and two flanges 48 extending in the same direction as the side upright 42, i.e. substantially in the Z direction, in the (X, Z) plane perpendicular to the plane of the rear window 35. Each of the flanges 48 has an edge on the outside of the vehicle that is extended by a rim pressed against the window 35 and secured by adhesive. Thus, the chamber 44 defines a hollow body that is particularly rigid for increasing the twisting strength of the small door 12.

As can be seen in FIG. 2, the large door 14 on which the small door 12 is fitted is defined by a large frame 50, made of a thermosetting material such as sheet molding compound (SMC), a composite, or a hybrid material. The frame 50 has a top horizontal edge 52, a bottom horizontal edge 54, and two uprights 56, these edges and uprights together defining an opening 58 enabling the rear window 35 to be uncovered so that the driver can see therethrough, said opening 58 also being of a height greater than that of the rear window 35, since it extends further down the vehicle, so as to give access to the intermediate compartment while minimizing the weight of the large frame 50. As can be seen in FIG. 2, the large frame 50 carries a bodywork panel 74, either made integrally with the large frame 50, or else fitted onto said large frame or under the edge 54.

Each side upright 56 of the large door 14 comprises, in the same manner as the upright 42 of the small door 12, a channel-section chamber 60 with its open face directed towards the outside of the vehicle, and configured in such a manner as to be capable of interfitting with the corresponding chambers 44. As can be seen in FIG. 4, the chamber 60 is defined by two flanges 62 extending in the same direction as the flanges 48, and by a web 64 that includes a setback 66 constituting means for centering the large frame relative to the rear ring 16 of the body. This setback 66 increases the twisting strength about the axis A of the large frame 50.

Since the uprights 42 and 56 can be engaged one in the other, it can be seen that they are inscribed within an envelope 68 of thickness e in the longitudinal direction X that is less than the sum of the thicknesses $e_1$ and $e_2$ of the uprights 42 and 56. More precisely, the thickness e is practically equal to and slightly greater than each of the thicknesses $e_1$ and $e_2$.

As can be seen in FIG. 4, each upright 42 carries a first weather strip 70 providing sealing between each upright 42 and the corresponding upright 46 of the large door in which it is engaged. In addition, the rear ring 16 of the body also carries a second weather strip 72 providing sealing between each upright 56 and the corresponding portion of the rear ring 16 of the body. The two weather strips 70 and 72, are in register with each other, so as to balance pressures when the doors are slammed.

It should be observed that the small door 12 is stronger in twisting than the large door 14. In other words, when the small door 12 is in the open position on the vehicle, if a point 80 is situated in the center of the bottom edge of the small door 12, on its axis A', is held stationary, and if a force F is applied to one of the ends 82 of said bottom edge, then the small door 12 deforms through an angle that is smaller than the angle through which the large door 14 would deform if it were held at a point 84 situated in register with the point 82 and if the same force F were applied to its corresponding end 86.

Naturally, it is possible to use the method of comparison proposed in the beginning of the description.

The operation of the rear module is described below.

Two configurations are possible, either the small door 12 is opened while leaving the large door 14 secured to the rear ring 16 of the body, or else the large door 14 is opened, together with the small door 12.

To implement these two configurations, locks 88 and 90 are used that are arranged respectively on the small door 12 and on the large door 14. To open the small door 12, the lock 88 is released while leaving the lock 90 engaged. To open the large door 14, the lock 88 is engaged while the lock 90 is released.

Figure 5:
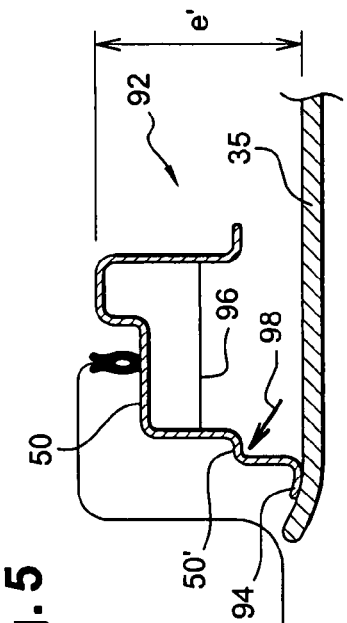
FIG. 5 is a view similar to FIG. 4 of a rear module having a single door forming part of a set in an embodiment of the invention.
Figure 3:
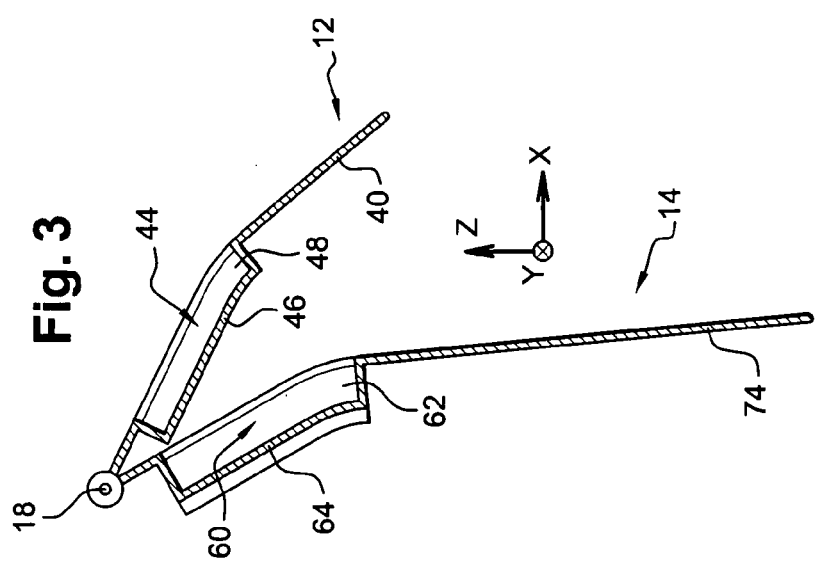
FIG. 3 is a diagrammatic section view of the FIG. 1 rear module, on a section longitudinal plane a-a of FIG. 2, parallel to plane (X, Z) and passing through the uprights of the doors.

FIG. 5 shows a large frame 92 mounted on a vehicle having a single rear door, but which could have been mounted on a vehicle having two rear doors such as the doors 12 and 14 of FIG. 4.

The section of the large frame 92 has uprights constituted by two portions formed integrally therewith, namely a main portion 50 identical to that shown in FIGS. 2 and 4, and an additional portion 50' extending the main portion 50, enabling the frame 92 to be given sufficient thickness to be fitted to a rear module provided with a single door. Under such circumstances, the frame 92 of FIG. 5 is fitted onto a rear window 35, e.g. with adhesive on one of the ends 94 of the frame.

Ribs 96 are formed on the web of the channel-section of the main portion 50.

If it is desired to use the same frame 92 for fitting on a vehicle provided with two uprights, it suffices to cut the additional portion 50' at the position indicated by arrow 98 so as to obtain a frame 50 that is identical to the frame of FIGS. 2 and 4.

It should be observed that separating the portions 50' and 50 is particularly easy, and less expensive than making two different modules for manufacturing two specific frames.

Amongst the advantages of the invention, it should be observed that the rear module provided with the doors 12 and 14 is compact in the X direction, in particular because its uprights are mutually engaged.

Finally, it should be observed that the invention is not limited to the embodiments described above. In particular, these embodiments could be combined with the indications given before the description of the figures. An embodiment is described with engagement between portions of the uprights, however it is possible to envisage mutual engagement between the lateral portions of the uprights over their full length in the Z direction, and also between other portions of the doors, such as the top edges 38, 52 and the bottom edges 40, 54.

What is claimed is:

1. A rear module for fitting to a motor vehicle, the module comprising:
   a large door for being pivotally mounted about an axis, the large door being delimited in a direction parallel to said axis by two stiffener uprights both presenting a cross-section of maximum thickness, taken perpendicularly to the door, that is equal to a first thickness, the large door having an opening extending as far as said uprights in the direction parallel to said axis; and
   a small door mounted on the large door to move between an open position uncovering said opening, and a closed position closing said opening, the small door being delimited in the direction parallel to the axis by two stiffener uprights both having a cross-section of maximum thickness, taken perpendicularly to the door, that is equal to a second thickness, the uprights of the small door covering the uprights of the large door when the small door is in the closed position:
   wherein the uprights of the small door and the uprights of the large door are shaped in such a manner as to engage in pairs one in another when said small door is in the closed position so as to present a maximum thickness taken perpendicularly to the door, that is less than the sum of the first and second thicknesses.

2. A module according to claim 1, in which the uprights of the small door and of the large door are both of U-shaped channel-section having their open faces directed towards one of an inside and outside of the vehicle.

3. A module according to claim 2, in which the small door includes a rear window and at least one outside edge of each upright of the small door is secured to the rear window.

4. A module according to claim 1, including a first weather strip arranged between each lateral upright of the small door and the lateral upright of the large door in which the lateral upright of the small door is engaged, and designed to be in register with a second weather strip arranged on a body of the vehicle.

5. A module according to claim 1, in which the small door is stronger in torsion than the large door.

6. A module according to claim 1, in which the small door comprises a first bodywork panel that is opaque extending over its entire width, and the large door includes a second bodywork panel which enlarges the first panel.

7. A module according to claim 1, in which the uprights of the large door comprise, on their inside faces, centering means for centering the large door relative to a rear ring of the vehicle body.

8. A module according to claim 1, in which the uprights of the doors are made of plastics material.

9. A set of two rear modules suitable for being fitted on a same motor vehicle, comprising:
   a first rear module for fitting to a motor vehicle, the module comprising:
      a large door for being pivotally mounted about an axis, the large door being delimited in a direction parallel to said axis by two stiffener uprights both presenting a cross-section of maximum thickness, taken perpendicularly to the large door, that is equal to a first thickness, the large door having an opening extending as far as said uprights in the direction parallel to said axis; and
      a small door mounted on the large door to move between an open position uncovering said opening, and a closed position said opening, the small door being delimited in the direction parallel to the axis by two stiffener uprights both having a cross-section of maximum thickness, taken perpendicularly to the small door, that is equal to a second thickness, the uprights of the small door covering the uprights of the large door when the small door is in the closed position,
   wherein the uprights of the small door and the uprights of the large door are shaped in such a manner as to engage in pairs one in another when said small door is in the closed position so as to present a maximum thickness taken perpendicularly to the large door, that is less than the sum of the first and second thicknesses; and
   a second rear module having a single door, which single door is delimited, in the direction parallel to the axis, by two stiffener uprights both presenting a total cross-section constituted by a main portion and an additional portion, the main portion being identical to the cross-section of the uprights of the large door of the two-door module, and the additional portion being shaped in such a manner as to increase the thickness of the total cross-section taken perpendicularly to the single door in such a manner that said thickness is equal to the maximum thickness of two mutually-engaged uprights of the two-door module.

* * * * *